（12）United States Patent
Hong et al.

(10) Patent No.: US 9,329,627 B2
(45) Date of Patent: May 3, 2016

(54) METHOD OF RECOGNIZING A CONTROL COMMAND BASED ON FINGER MOTION ON A TOUCH INPUT DEVICE

(75) Inventors: Kwang-Seok Hong, Gwacheon-si (KR); Byung Hun Oh, Seoul (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 293 days.

(21) Appl. No.: 13/600,986

(22) Filed: Aug. 31, 2012

(65) Prior Publication Data

US 2013/0154924 A1  Jun. 20, 2013

(30) Foreign Application Priority Data

Dec. 16, 2011 (KR) ........................ 10-2011-0136074

(51) Int. Cl.
*G06F 3/048* (2013.01)
*G06F 3/0484* (2013.01)
*G06F 7/57* (2006.01)
*G06F 1/16* (2006.01)
*G06F 3/0488* (2013.01)

(52) U.S. Cl.
CPC ............ *G06F 1/1626* (2013.01); *G06F 1/1647* (2013.01); *G06F 1/1654* (2013.01); *G06F 1/1692* (2013.01); *G06F 3/04883* (2013.01)

(58) Field of Classification Search
CPC ....................................................... G06F 3/048
USPC .................................................. 345/156–183
See application file for complete search history.

(56) References Cited

U.S. PATENT DOCUMENTS 6,340,967 B1 * 1/2002 Maxted ............................ 345/179
8,169,421 B2 * 5/2012 Wright et al. ................... 345/179
2010/0164904 A1 * 7/2010 Kim et al. ....................... 345/174

* cited by examiner

*Primary Examiner* — Temesgh Ghebretinsae
*Assistant Examiner* — Lisa Landis
(74) *Attorney, Agent, or Firm* — NSIP Law

(57) ABSTRACT

Provided is a method of recognizing a control command based on finger motion involving: (a) obtaining coordinate data of a pointer corresponding to a position of a finger in contact with a touch input device of a mobile terminal; (b) obtaining an input continuance time of the coordinate data, and setting values of timer variables based on the input continuance time; (c) setting logic values of a plurality of command logic variables whose logic values of True or False are based on values of the respective timer variables; and (d) recognizing an operation control command of the pointer based on the respective timer variable values and the command logic variable values.

15 Claims, 6 Drawing Sheets

(a)

(b)

OPERATION MENU OF
MOBILE TERMINAL

EXAMPLE OF FRONT-SURFACE TOUCH
SCREEN (BOTH HANDS CAN BE USED)

EXAMPLE OF BACK-
SURFACE TOUCH
INPUT DEVICE

EXAMPLE OF MOVEMENT
OF FINGER ON BACK-
SURFACE TOUCH INPUT
DEVICE

EXAMPLE OF VISUALIZATION
OF MOVEMENT OF POINTER
DISPLAY SCREEN ON FRONT-
SURFACE

10

METHOD OF RECOGNIZING A CONTROL COMMAND BASED ON FINGER MOTION ON A TOUCH INPUT DEVICE

CROSS-REFERENCE TO RELATED APPLICATION

This application claims the benefit under 35 U.S.C. §119(a) of Korean Patent Application No. 2011-0136074, filed on Dec. 16, 2011, in the Korean Intellectual Property Office, the entire disclosure of which is incorporated herein by reference for all purposes.

BACKGROUND

1. Field

The following description relates to a method of recognizing a control command based on motion of a user's finger, and to a method by which a mobile terminal recognizes a control command based on motion of a user's finger in contact with a touch input device.

2. Description of Related Art

Recently, mobile terminals such as smart phones are widely used by the public. Thus, a method by which a user may conveniently manipulate various contents embedded in such a mobile terminal is in demand.

Depending on the circumstances of use, sometimes it is desirable for a user of a mobile terminal to control the mobile terminal and the contents played on the mobile terminal with the use of one hand.

A multi-touch method in which two fingers are used to manipulate contents displayed on a touch screen is currently used in some digital devices. A convenient method of manipulating a mobile terminal and its related contents with the use of one hand is desirable.

SUMMARY

In one general aspect, there is provided a method of recognizing a control command based on finger motion, involving: (a) obtaining coordinate data of a pointer corresponding to a position of a finger in contact with a touch input device of a mobile terminal; (b) obtaining an input continuance time of the coordinate data, and setting values of timer variables based on the input continuance time; (c) setting logic values of a plurality of command logic variables whose logic values of True or False are based on values of the respective timer variables; and (d) recognizing an operation control command of the pointer based on the respective timer variable values and the command logic variable values.

In the general aspect of the method, the respective timer variables may be Timer before (Tb), Timer after (Ta) and Timer middle (Tm); the timer variables Tb, Ta and Tm may receive a time value as input; and values of the respective timer variables Tb, Ta and Tm may be compared with a predefined time value to determine a role that the variables Tb, Ta and Tm perform for the operation control command of the pointer.

Each of the timer variable may include a logic value field set to True when a time value is input, and False when no time value is input.

The command logic variables may include Click, D_Click, Drag, and Moving, and the logic values of the command variables Click, D_Click, Drag, and Moving respectively corresponding to a click operation, a double click operation, a drag operation, and a moving operation.

In the general aspect of the method, (b), (c) and (d) may have a first state, a second state, a third state and a fourth state according to the values of command logic variables Tb, Ta and Tm, whether or not coordinate data of the pointer is input, and logic values of Click, D_Click, Drag, and Moving.

In the general aspect of the method, when a logic value of Tb is True, logic values of Tm and Ta are False, and coordinate data of the pointer is not input within a time duration defined in advance as Tb, the first state may proceed to the second state; a logic value of Drag may be set to True, and a logic value of Moving may be set to False when two or more pieces of pointer coordinate data are input within the time duration defined in advance as Tb; if the logic value of Moving has been set to True when input of the time value of Tb is completed, operation control of the pointer may be recognized as Moving, and the first state may proceed to the second state, and if the logic value of Moving has been set to False and the logic value of Drag has been set to True when input of the time value of Tb is completed, operation control of the pointer may be recognized as Drag, and the first state may proceed to the second state.

In the general aspect of the method, when logic values of Tb, Tm and Ta are False, and no coordinate data of the pointer is input, the second state may be maintained, and when coordinate data of the pointer is input, the second state may proceed to the third state.

In the general aspect of the method, when a logic value of Tb is "False," logic values of Tm and Ta are True, and no coordinate data of the pointer is input or only one piece of coordinate data of the pointer is input within a time duration defined in advance as Tm, a logic value of Click may be set to True, and the third state may proceed to the fourth state; and when two or more pieces of coordinate data of the pointer are input within the time duration defined in advance as Tm, a logic value of Moving is set to True, and the third state proceeds to the first state.

In the general aspect of the method, when logic values of Tb and Tm are True, and two or more pieces of coordinate data of the pointer are input, a logic value of Click may be set to False, a logic value of Moving may be set to True, and the fourth state may proceed to the first state; when one piece of coordinate data of the pointer is input within a time duration defined in advance as Ta, the logic value of Click may be set to False, and a logic value of D_Click is set to True; if the logic value of Click is to True when the time duration defined in advance as Ta elapses, operation control of the pointer may be recognized as Click; and if the logic value of Click is to False when the time duration defined in advance as Ta elapses, operation control of the pointer may be recognized as Double Click, and the fourth state proceeds to the first state.

In the general aspect of the method, (c) may include setting a logic value of a command logic variable corresponding to Click when a first time duration set in advance as Ta elapses, and performing no process during the first time duration that has been set as Ta in advance even if data is input.

In the general aspect of the method, (c) may include setting a logic value of a command logic variable corresponding to Drag when 10 or more pieces of data are input during a second time set in advance as Tm, and setting logic values of command logic variables corresponding to up, down, left and right Moving when less than 10 pieces of data are input.

In the general aspect of the method, (c) may include setting a logic value of a command logic variable corresponding to D_Click when data is input during the second time duration set in advance as Tm.

In another general aspect, there is provided a method of recognizing a control command based on finger motion on a mobile terminal having a display screen and a touch input device, the method including: detecting a finger contact on the touch input device; determining coordinates of a pointer based on a position of the finger contact; and recognizing an operation control command based on an input continuance time of the finger contact and a direction of movement of the finger on the touch input device.

In the general aspect of the method, the touch input device may be provided on a back surface of the mobile terminal; and the display screen may be provided on a front surface of the mobile terminal.

The general aspect of the method, may further include: displaying a pointer on the display screen, wherein the pointer moves on the display screen based on the movement of the finger on the touch input device.

In the general aspect of the method, the operation control command recognized by the mobile terminal may include at least one of: a click operation, a double click operation, a drag operation, and a moving operation.

In another general aspect, there is provided a mobile terminal comprising a display screen and a touch input device, wherein the mobile terminal is configured to perform the method described above.

In yet another general aspect, there is provided a non-transitory recording medium, the recording medium storing an instruction that causes a mobile terminal to perform the method described above.

Other features and aspects may be apparent from the following detailed description, the drawings, and the claims.

Figure 1:
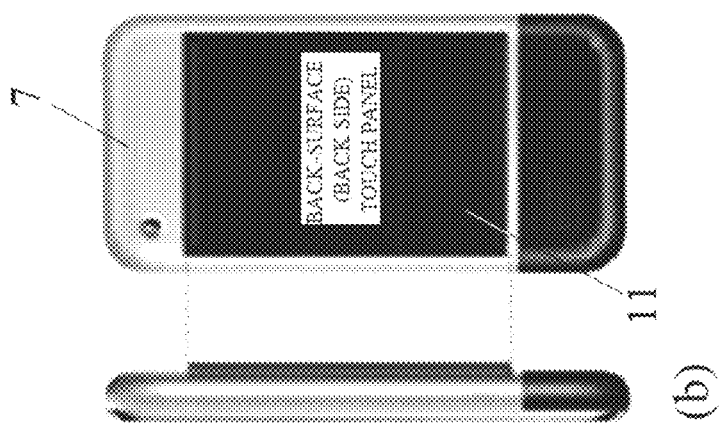
FIG. 1 illustrates an example of a mobile terminal having a touch input device.
Figure 1:
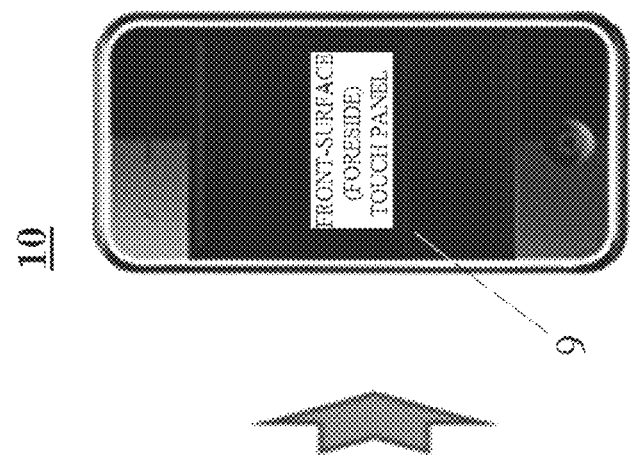
Figure 1:
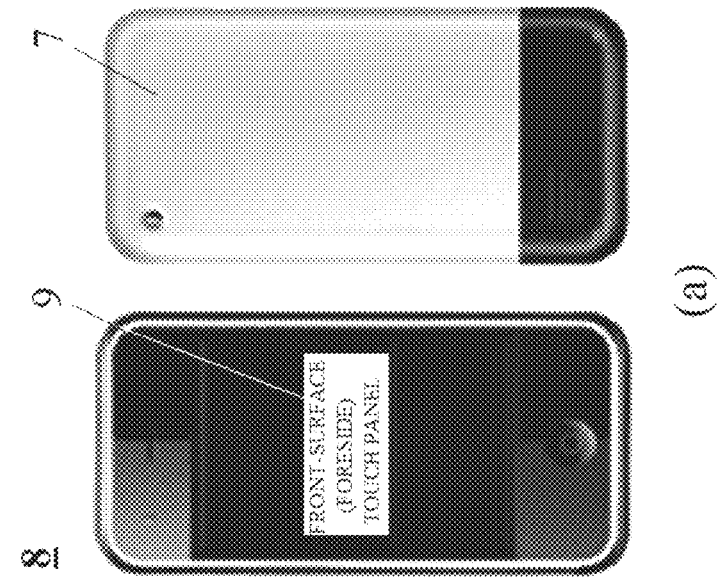

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Meanwhile, terminology used herein will be understood as follows. Although the terms "first," "second," etc. may be used herein to describe various elements, these elements should not be limited by these terms. These terms are only used to distinguish one element from another. For example, a first element could be termed a second element, and, similarly, a second element could be termed a first element.

As used herein, the singular forms are intended to include the plural forms as well, unless the context indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. It should also be noted that in some alternative implementations, the processes noted in the blocks may occur out of the order noted in the flowcharts, unless the context clearly indicates a specific order. In other words, respective processes may be executed in a specified order, executed substantially concurrently, or executed in the reverse order.

Unless otherwise defined, terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates an example of a mobile terminal 10 having a touch input device 11 on its back surface 7. Referring to FIG. 1, an existing mobile terminal 8 having a single touch input device 9 on its front surface and the mobile terminal 10 having the touch input device 11 on its back surface are shown in comparison with each other. In this example, the touch input device 11 is a touch panel provided on a back surface of the mobile terminal 10. However, in other examples, the touch input device 11 may be provided at another location of the mobile terminal, or be detachably attached to the mobile terminal.

Figure 2:
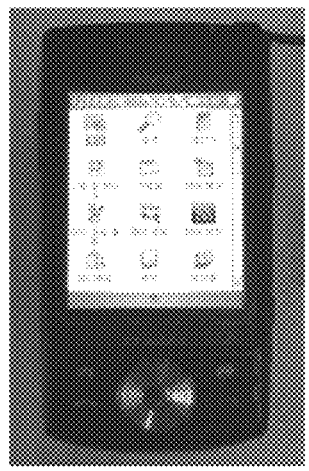
FIG. 2 illustrates an example of a method of using a mobile terminal having a touch input device.
Figure 2:
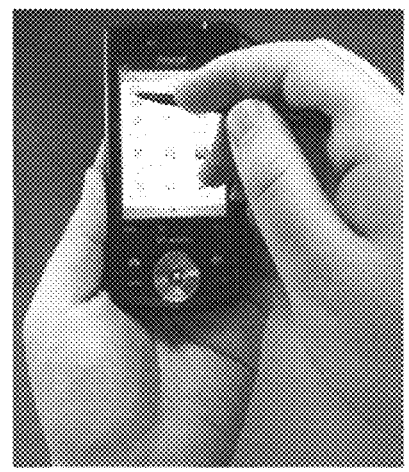
Figure 2:
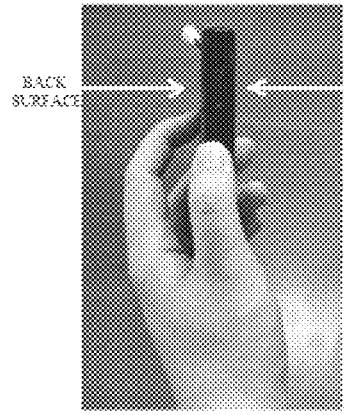
Figure 2:
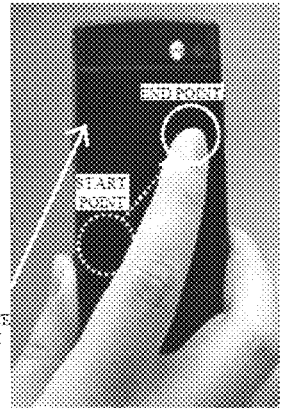
Figure 2:
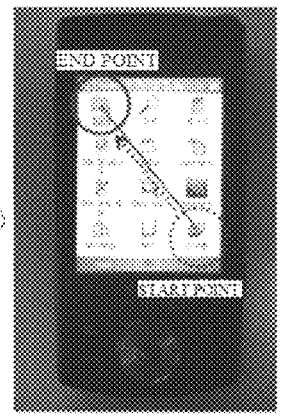

FIG. 2 illustrates an example of a method of functionally using a mobile terminal 10 having a touch input device 11 on its back surface. Referring to FIG. 2, a process of operating and controlling the corresponding menu, the corresponding content, etc. using the touch input device 11 on the back surface of the terminal 10 is illustrated.

For example, the mobile terminal 10 may include a front-surface touch panel as a touch input device 9 that allows a user to use a stylus to manipulate the operation menu. To use a stylus to manipulate the operation menu, the user may need to use both hands. In this example, one hand is used to hold the mobile terminal 10, while the other hand is used to hold a stylus. In other examples, the touch input device 11 may allow the user to touch the display screen to manipulate the operation menu.

Another method of using the mobile terminal 10 may include holding the mobile terminal 10 with one hand with an index finger facing the back surface 7 of the mobile terminal 10. The user may touch the touch input device 11 provided on the back surface 7 of the mobile terminal 10 to move a pointer displayed on the display screen 9 on the front surface of the mobile terminal 10.

In this example, the mobile terminal 10 allows the user to visualize the movement of the finger on the back surface 7 of the mobile terminal 10 by displaying a pointer on the front-surface display screen 9.

Figure 3:
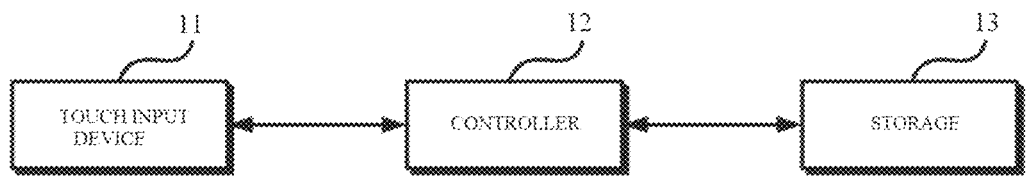
FIG. 3 is an example of a block diagram of a mobile terminal in which a method of recognizing a pointer control command based on finger motion is implemented.

FIG. 3 is a block diagram of an example of a mobile terminal 10 in which a method of recognizing a pointer control command based on finger motion is implemented. Referring to FIG. 3, the mobile terminal 10 includes a touch input device 11 that is fixed or can be attached and detached from the mobile terminal 10, a controller 12, and a storage 13. On the basis of this constitution of the mobile terminal 10, a method of recognizing a pointer control command based on finger motion is described below. In the mobile terminal 10, a pointer control command may be input through the touch input device 11 disposed on the back surface of the mobile terminal 10. Examples of devices that may be used as the touch input device 11 include a touch panel, a touch pad, and the like. When a display function is unnecessary on the back surface of the mobile terminal, a device that only recognizes a touch may be used as the touch input device 11. Further, the touch input device 11 may be disposed on other surfaces of the mobile terminal 10 or provided in a detachably attached device.

Figure 4:
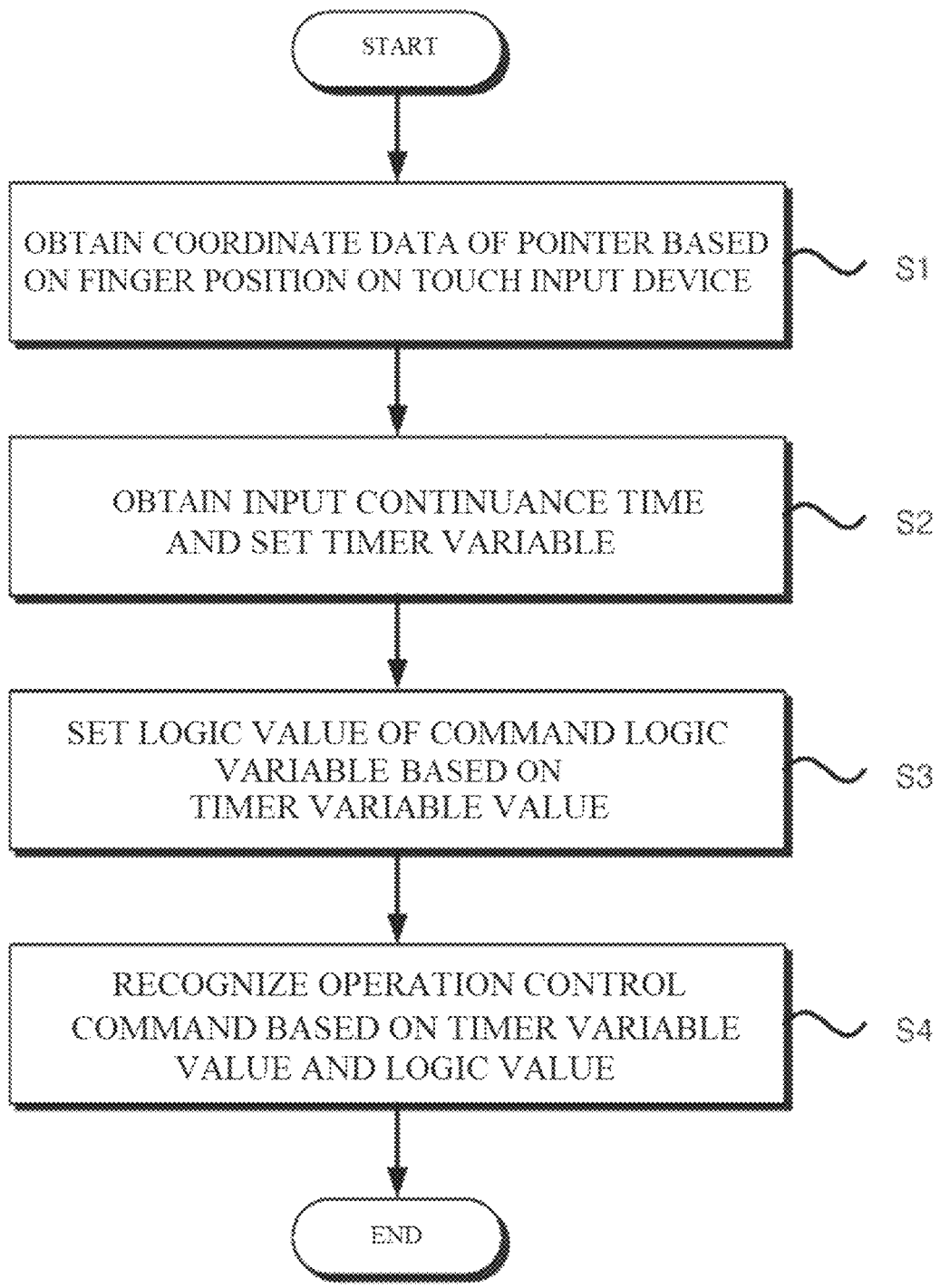
FIG. 4 is a flowchart illustrating an example of the overall process of a method of recognizing a pointer control command based on finger motion.

FIG. 4 is a flowchart illustrating an example of the overall process of a method of recognizing a pointer control command based on finger motion. Referring to FIG. 3 and FIG. 4, a touch input device 11 may be provided in the mobile terminal 10 and fixed to the mobile terminal 10. In the alternative, the touch input device 11 may be attached and detached from the mobile terminal 10. In step S1, the mobile terminal 10 obtains coordinate data of a pointer that corresponds to a finger position on the touch input device 11 provided on a back surface of the mobile terminal 10.

After the coordinate data is obtained, in step S2, the controller 12 of the mobile terminal 10 receives an input continuance time of the coordinate data received via the touch input device 11 as one or more timer variables for counting the input continuance time, and sets values of timer variables. Then, the controller 12 stores the timer variables in a storage 13.

In this example, respective timer variables, Timer before (Tb), Timer after (Ta) and Timer middle (Tm) are variables for which a time value is input for storage.

In this example, the values stored in times variables Tb, Ta and Tm are each compared with a predefined time value, and an operation control command of the pointer is performed using the variables Tb, Ta and Tm.

After performing step S2, in step S3, the controller 12 sets a plurality of command logic variables whose logic values of "True" or "False" are selected on the basis of the timer variables respectively, and stores the set command logic values in the storage 13. To this end, each of the timer variables Tb, Ta and Tm includes a logic value field that is set to "True" when a time value is input, and "False" when no time value is input.

In this example, there are at least four command logic variables: Click, D_Click, Drag, and Moving, the logic values of which correspond to a click operation, a double click operation, a drag operation, and a moving operation, respectively. The moving operation does not denote an operation of moving a specific object displayed on a display screen. Rather, the moving operation denotes an operation of moving a whole screen in a predetermined direction.

After setting the command logic variables, in step S4, the controller 12 recognizes an operation control command of the pointer on the basis of the respective timer variable values and the plurality of command logic variable values.

The controller 12 is placed in a first state, a second state, a third state, and a fourth state according to: the values of variables Tb, Ta and Tm; whether or not pointer coordinate data is input; and the logic variable values of Click, D_Click, Drag, and Moving.

Figure 5:
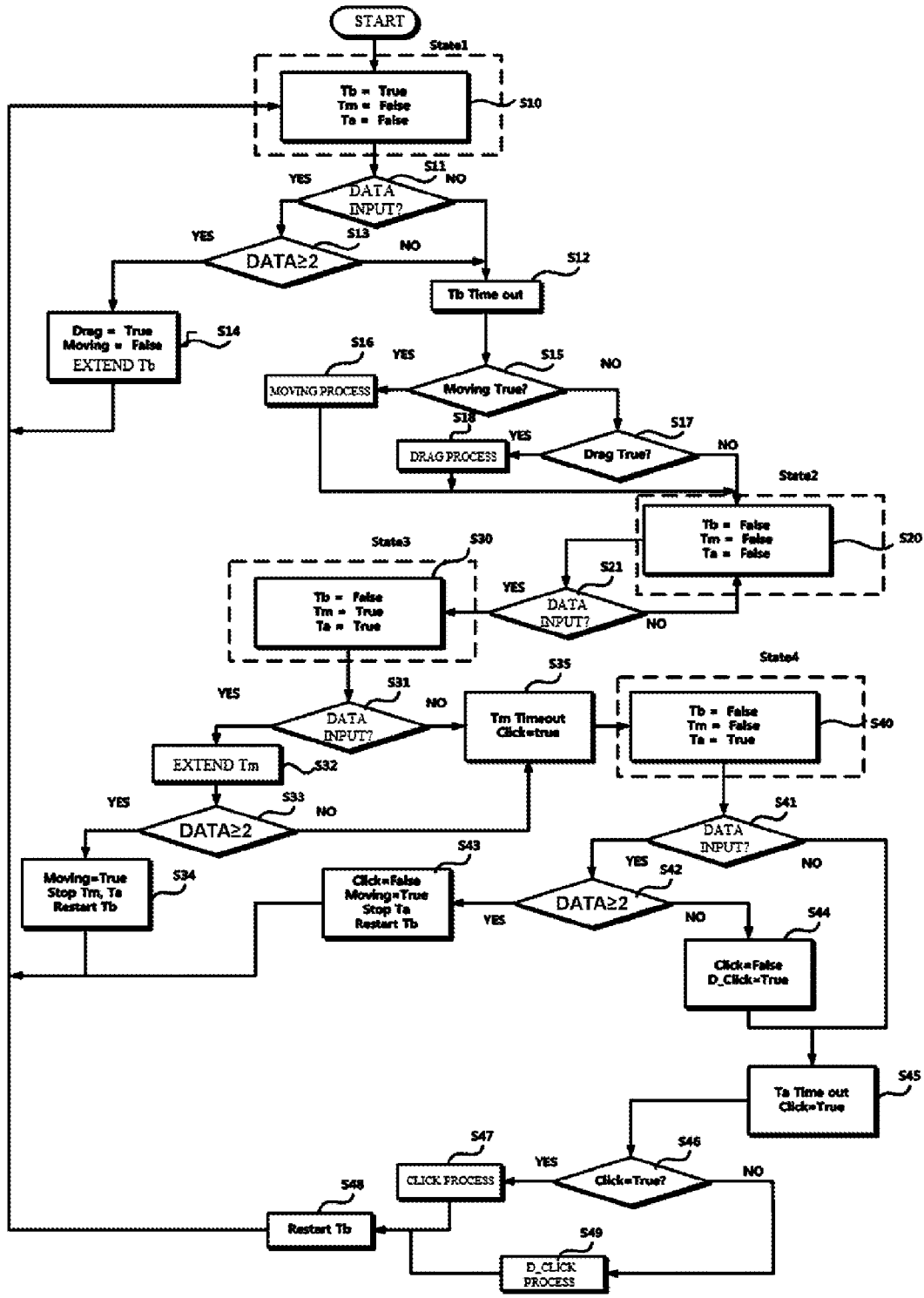
FIG. 5 is a flowchart illustrating an example of a process of performing step S4 illustrated in FIG. 4.

FIG. 5 is a flowchart illustrating an example of a process by which step S4 of FIG. 4 may be implemented.

In order for the controller 12 to recognize an operation control command of the pointer on the basis of the respective timer variable values and the plurality of command logic variable values after step S3, in the first state, a logic value of Tb is set to "True" and logic values of Tm and Ta are set to "False" in step S10. In this example, setting of the value involves either assigning a different value or maintaining the stored value, based on the value that is already stored in the variable. However, in other example, a new value may be assigned to the variable without checking whether the variable already contains the same value.

After step S10, if coordinate data of the pointer is not input to the touch input device 11 within a time that has been defined as Tb in advance (S11 and S12), and the controller 12 proceeds to the second state (S20). For example, when coordinate data of the pointer is not received within the time that has been set as Tb in advance, a logic value of Moving is set to "False," and a logic value of Drag is set to "False," and the controller 12 proceeds to the second state.

Meanwhile, if the logic value of Moving has been set to "True" when input of the time value of Tb is completed, the controller 12 recognizes operation control of the pointer as Moving and proceeds to the second state, as illustrated in step S16.

More specifically, if the logic value of Moving has been set to "False" in step S15, and a logic value of Drag has been set to "True" in step S17, when input of the time value of Tb is completed in step S12, the controller 12 recognizes operation control of the pointer as Drag as in step S18 and proceeds to the second state in S20.

Meanwhile, when two or more pieces of coordinate data of the pointer are input within the time that has been defined as Tb in advance (S11 and S13), the controller 12 sets the logic value of Drag to "True" and the logic value of Moving to "False" (S14). Also, the controller 12 extends the time value that has been set as Tb in advance.

The controller 12 causes the second state to start with logic values of Tb, Tm and Ta set to "False" (S20), and maintains the second state when no coordinate data of the pointer is input to the touch input device 11 (S21).

For example, the controller 12 proceeds to the third state (S30) when coordinate data of the pointer is input to the touch input device 11 (S21), and maintains the second state when no coordinate data of the pointer is input to the touch input device 11 (S21).

The controller 12 causes the third state to start with a logic value of Tb set to "False" and logic values of Tm and Ta set to "True" (S30). When no coordinate data of the pointer is input to the touch input device 11 (S31) or only one piece of coordinate data of the pointer is input within a time that has been defined as Tm in advance (S33), the controller 12 may set a logic value of Click as "True" (S35) and proceeds to the fourth state (S40). In this example, even when only one piece of coordinate data of the pointer is input in step S31, the controller 12 extends the time value that has been set as Tm in advance (S32).

When two or more pieces of coordinate data of the pointer are input to the touch input device 11 within the time value that has been defined as Tm in advance in step S33, the controller 12 sets the logic value of Moving to "True" as in step S34 and proceeds to the first state as in step S10. In step S34, the controller 12 stops changes of time values that have been defined as Tm and Ta in advance, resets the time value that has been defined as Tb in advance, and then proceeds to the first state.

Meanwhile, the controller 12 causes the fourth state to start with logic values of Tb and Tm set to "False" and a logic value of Ta set to "True" (S40). When two or more pieces of coordinate data of the pointer are input to the touch input device 11

(S42), the controller 12 sets the logic value of Click to "False" and the logic value of Moving to "True" (S43) and proceeds to the first state (S10). In step S42, the controller 12 stops a change of the time value that has been defined as Ta in advance, resets the time value that has been defined as Tb in advance, and then proceeds to the first state.

When two or more pieces of coordinate data of the pointer are not input to the touch input device 11 (S42) after the controller 12 causes the fourth state to start with the logic values of Tb and Tm set to "False" and the logic value of Ta set to "True" (S40), the controller sets the logic value of Click to "False" and a logic value of D_Click to "True" (S44).

After step S44, if the logic value of Click has been set to "True" when the time value that has been defined as Ta in advance elapses (S45), the controller 12 recognizes operation control of the pointer input to the touch input device 11 as Click (S47). Here, when the logic value of Click has been set to "False," the controller 12 recognizes the operation control of the pointer as D_Click (S49) and proceeds to the first state (S10).

Meanwhile, after step S47 and step S49, the controller 12 resets the time value that has been set as Tb in advance (S48), and then proceeds to the first state.

Figure 6:
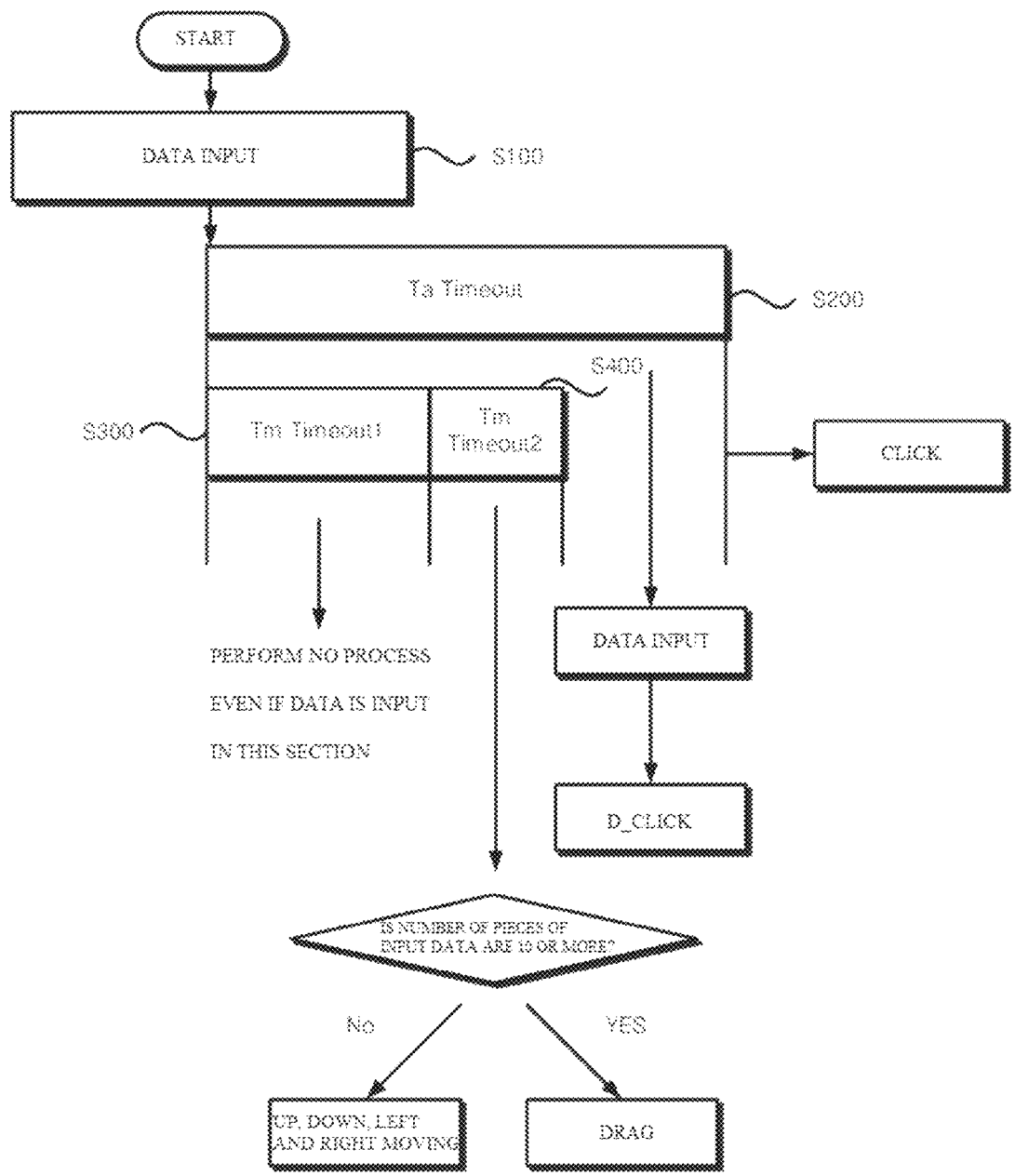
FIG. 6 is a diagram illustrating an example of a process of setting logic values of command logic variables in accordance with step S3 of FIG. 4.

FIG. 6 is a diagram illustrating an example of a process of setting logic values of command logic variables corresponding to Click, D_Click, Moving, and Drag in step S3 of FIG. 4. Referring to FIG. 3 to FIG. 6, the controller 12 sets a logic value of a command logic variable corresponding to Click when a time that has been set as Ta in advance elapses (S200) after data input (S100).

Meanwhile, during the duration of a first time period (Timeout 1) that has been set as Tm in advance, the controller 12 performs no process even if data is input (S300).

Meanwhile, when, for example, 10 or more pieces of data are input during the duration of a second time period (Timeout 2) that has been set as Tm in advance, the controller 12 sets a logic value of a command logic variable corresponding to Drag. On the other hand, when, for example, less than 10 pieces of data are input, the controller 12 sets logic values of command logic variables corresponding to up, down, left and right Moving.

Finally, when data is received during the time that has been set as Ta in advance and the second time that has been set as Tm in advance, the controller 12 sets a logic value of a command logic variable corresponding to D_Click.

As described above, a method of recognizing a pointer control command based on finger motion may provide a set of commands for click, double click, drag and drop, and moving operations using a touch input device on a back surface of a mobile terminal, thereby providing a convenient and efficient user interface.

Depending on the circumstances of use, sometimes it is desirable for a user of a mobile terminal to control the mobile terminal and the contents played on the mobile terminal with the use of one hand.

A multi-touch method in which two fingers are used to manipulate contents displayed on a touch screen is currently used in some digital devices, and a method of using a user's finger photographed by an image device disposed on the back surface of a mobile terminal as a pointer are also being researched.

In the above description, there is provided an example of a touch input device that is provided in a mobile terminal. Such a touch input device may be fixed to or may be detachably attached to the mobile terminal to perform a function of a separate touch input device. Such a touch input device may also to be used with a front-surface touch input device such that the mobile terminal can be operated and controlled with both hands or with only one hand.

There is also provided an example of a method of recognizing a pointer control command based on finger motion that is intended to efficiently control a mobile terminal, relevant content, etc. by continuously sensing motion of a user's finger in contact with, or placed on, a touch panel attached to a back surface, visually transferring a movement path of a touch point on a front surface. The method may allow recognizing click, double click, moving, and drag operations based on finger motion to allow a user to select a content of interest or an operation menu.

There is also provided an example of a method of recognizing a control command based on finger motion, the method including: (a) receiving coordinate data of a pointer corresponding to a position of a finger in contact with a touch input device disposed on a back surface of a mobile terminal; (b) receiving an input continuance time of the coordinate data as one or more timer variables for counting the input continuance time, and setting timer variable values; (c) setting logic values of a plurality of command logic variables whose logic values of True or False are selected on the basis of the respective timer variable values; and (d) recognizing an operation control command of the pointer on the basis of the respective timer variable values and the command logic variable values.

As a non-exhaustive illustration only, a mobile terminal described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein. A mobile terminal may include a software component and a hardware component, such as a processing device, memory storage, a display screen, a camera, a key pad, etc.

Examples of a touch input device includes a touch screen, a touchpad, and the like, that may detect the presence and/or location of a touch. A touch screen is an electronic visual display device that can detect the presence and location of a touch within the display area. The touch may be a touch by a finger or hand, or by other passive objects, such as a stylus. Examples of a touch screen include a resistive touch screen panel, a capacitive touch screen panel, a surface acoustic wave touch screen, and the like. A touchpad may include a specialized surface that may translate the motion and position of a user's finger or other passive objects to a relative position of a pointer on a screen.

Further, program instructions to perform a method described herein, or one or more operations thereof, may be recorded, stored, or fixed in one or more non-transitory recording media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A storage or memory may include a computer component and a recording medium used to retain digital data. Examples of a computer storage or memory include semiconductor storage read-write random-access memory, such as DRAM, hard disk drives, optical disc drives, and the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing a control command based on finger motion, the method comprising:
    obtaining coordinate data of a pointer corresponding to a position of a finger in contact with a touch input device of a mobile terminal;
    obtaining an input continuance time of the coordinate data and setting time values of timer variables based on the input continuance time, including setting a timer variable Timer before (Tb) to a first time value;
    setting logic values of a plurality of command logic variables whose logic values of True or False are based on the time values of the timer variables;
    recognizing an operation control command of the pointer based on the time values of the timer variable and the command logic variables values; and
    setting the time value of timer variable Tb to extend after the first time value when coordinate data for two different pointer locations are obtained by the touch input device within the first time value set for Tb,
    wherein the timer variables further include Timer after (Ta) and Timer middle (Tm); each of the timer variables Tb, Ta and Tm receives a time value as input; and time values of the timer variables Tb, Ta and Tm are compared with a predefined time value to determine a role that the variables Tb, Ta and Tm perform for the operation control command of the pointer, and
    wherein the setting of the logic values includes setting a logic value of a command logic variable corresponding to a click operation when a first time value set for Ta elapses and performing no process during the first time value set for Ta even if data is input; setting a logic value of a command logic variable corresponding to a drag operation when 10 or more pieces of the coordinate data are obtained during a second time value set for Tm; and setting logic values of command logic variables corresponding to up, down, left and right Moving when less than 10 pieces of the coordinate data are input.

2. The method of claim 1, wherein each of the timer variables includes a logic value field set to True when a time value is input and False when no time value is input.

3. The method of claim 1, wherein the command logic variables include Click, D_Click, Drag, and Moving, which respectively correspond to a click operation, a double click operation, a drag operation, and a moving operation.

4. The method of claim 3, further comprising transitioning between a first state, a second state, a third state, and a fourth state according to the time values of the timer variables Tb, Ta and Tm, whether or not the coordinate data of the pointer is input, and the logic values of Click, D_Click, Drag, and Moving.

5. The method of claim 4, further comprising:
    transitioning from the first state to the second state when a logic value field included in Tb is True, logic value fields included in Tm and Ta are both False, and the coordinate data of the pointer is not obtained within a time value set for Tb;
    setting the logic value of Drag to True and the logic value of Moving to False when two or more pieces of the coordinate data of the pointer are obtained within the time value set for Tb;
    recognizing the operation control of the pointer as Moving and transitioning from the first state to the second state when the logic value of Moving is True when the time value set for Tb elapses; and recognizing the operation control of the pointer as Moving and transitioning from the first state to the second state when the logic value of Moving is False and the logic value of Drag is True when the time value set for Tb elapses.

6. The method of claim 4, further comprising:

maintaining the second state when logic value fields included in each of Tb, Tm and Ta are each False and no coordinate data of the pointer is input; and transitioning from the second state to the third state when the coordinate data of the pointer is input.

7. The method of claim 4, further comprising:

setting the logic value of Click to True and transitioning from the third state to the fourth state when a logic value field included in Tb is False, logic value fields included in Tm and Ta are both True, and no coordinate data of the pointer is input or only one piece of the coordinate data of the pointer is input within a time value set for Tm; and setting the logic value of Moving to True and a transitioning from the third state to the first state when two or more pieces of the coordinate data of the pointer are input within the time value set for Tm.

8. The method of claim 4, further comprising:

setting the logic value of Click to False, setting the logic value of Moving to True, and transitioning from the fourth state to the first state when logic value fields included in Tb and Tm are both True and two or more pieces of the coordinate data of the pointer are obtained;

setting the logic value of Click to False and setting the logic value of D_Click to True when one piece of the coordinate data of the pointer is input within a time value set for Ta;

recognizing the operation control of the pointer as Click when the value of Click is True when the time value set for Ta elapses; and recognizing the operation control of the pointer as Double Click and transitioning from the fourth state to the first state when the value of Click is False when the time value set for Ta elapses.

9. The method of claim 1, wherein the setting of the logic values further includes setting a logic value of a command logic variable corresponding to a double click operation when the coordinate data is input during the second time value set for Tm.

10. A method of recognizing a control command based on finger motion on a mobile terminal having a display screen and a touch input device, the method comprising:

detecting a finger contact on the touch input device;

determining coordinates of a pointer based on a position of the finger contact;

obtaining an input continuance time of the pointer coordinates and setting time values of timer variables based on the input continuance time, including setting a timer variable Timer before (Tb) to a first time value;

setting logic values of a plurality of command logic variables whose logic values of True or False are based on the time values of the timer variables;

recognizing an operation control command based on the time values of the timer variable and the command logic variables; and setting the time value of timer variable Tb to extend after the first time value when coordinate data for two different pointer locations are obtained by the touch input device within the first time value set for Tb, wherein the timer variables further include Timer after (Ta) and Timer middle (Tm); each of the timer variables Tb, Ta and Tm receives a time value as input; and time values of the timer variables Tb, Ta and Tm are compared with a predefined time value to determine a role that the variables Tb, Ta and Tm perform for the operation control command of the pointer, and wherein the setting of the logic values includes setting a logic value of a command logic variable corresponding to a click operation when a first time value set for Ta elapses and performing no process during the first time value set for Ta even if data is input; setting a logic value of a command logic variable corresponding to a drag operation when 10 or more pieces of the coordinate data are obtained during a second time value set for Tm; and setting logic values of command logic variables corresponding to up, down, left and right Moving when less than 10 pieces of the coordinate data are input.

11. The method of claim 10, wherein the touch input device is provided on a back surface of the mobile terminal and the display screen is provided on a front surface of the mobile terminal.

12. The method of claim 10, further comprising:

displaying the pointer on the display screen, wherein the pointer moves on the display screen based on the movement of the finger on the touch input device.

13. The method of claim 10, wherein the operation control command recognized by the mobile terminal includes a click operation, a double click operation, a drag operation, or a moving operation.

14. A mobile terminal comprising a display screen and a touch input device, wherein the mobile terminal is configured to perform the method of claim 10.

15. A non-transitory recording medium, the recording medium storing an instruction that causes a mobile terminal to perform the method of claim 10.

* * * * *